(12) United States Patent
Harris

(10) Patent No.: US 11,700,121 B2
(45) Date of Patent: Jul. 11, 2023

(54) SECURE AUTHORIZATION FOR SENSITIVE INFORMATION

(71) Applicant: Amazon Technologies, Inc., Seattle, WA (US)

(72) Inventor: Daniel Morgan Harris, Grosse Pointe Farms, MI (US)

(73) Assignee: Amazon Technologies, Inc., Seattle, WA (US)

( * ) Notice: Subject to any disclaimer, the term of this patent is extended or adjusted under 35 U.S.C. 154(b) by 456 days.

(21) Appl. No.: 16/570,775

(22) Filed: Sep. 13, 2019

(65) Prior Publication Data

US 2021/0083873 A1  Mar. 18, 2021

(51) Int. Cl.
*H04L 9/32* (2006.01)
*G06F 21/60* (2013.01)
*H04L 9/08* (2006.01)

(52) U.S. Cl.
CPC .......... *H04L 9/3213* (2013.01); *G06F 21/602* (2013.01); *G06F 21/604* (2013.01); *H04L 9/0819* (2013.01)

(58) Field of Classification Search
CPC ... H04L 9/3213; H04L 9/0819; H04L 9/0822; H04L 9/0866; H04L 9/088; H04L 63/0807; H04L 9/3297; H04L 63/108; G06F 21/602; G06F 21/604

See application file for complete search history.

(56) References Cited

U.S. PATENT DOCUMENTS 9,819,672 B1 * 11/2017 Machani ............ H04L 63/0853
9,961,066 B1 *  5/2018 Kitchen ............. H04L 63/0807
2003/0005118 A1 *  1/2003 Williams .............. H04L 63/10
                                                                    709/225
2004/0236938 A1 * 11/2004 Callaghan ........... H04L 63/0807
                                                                    713/150
2009/0300744 A1 * 12/2009 Guo ..................... H04L 63/105
                                                                    726/7
2012/0214444 A1 *  8/2012 McBride ............... H04L 63/08
                                                                    455/411
2013/0086669 A1 *  4/2013 Sondhi ............... H04W 12/068
                                                                    726/8
2016/0191528 A1 *  6/2016 McMurtry ........... H04L 63/10
                                                                    726/4

(Continued)

FOREIGN PATENT DOCUMENTS

WO    WO-2018125158 A1 *  7/2018  ....... G06F 16/24556

OTHER PUBLICATIONS

"AWS General Reference: Reference Guide," Version 1.0, ©2019 Amazon Web Services, Inc., 450 pages.

(Continued)

*Primary Examiner* — Trong H Nguyen
(74) *Attorney, Agent, or Firm* — Davis Wright Tremaine LLP

(57) ABSTRACT

Techniques for securing access to protected resources are provided. In the method and apparatus, an access key and proof of successful completion of a first authentication is obtained in connection to a request. The proof of completion of the first authentication and the access key are verified. The access key is then used to generate a determination that information in the access key indicates that a second authentication was successfully completed prior to allowing the request to be fulfilled.

20 Claims, 10 Drawing Sheets

(56) References Cited

U.S. PATENT DOCUMENTS

| | | | | |
|---|---|---|---|---|
| 2017/0085563 | A1* | 3/2017 | Royyuru | G06Q 20/12 |
| 2017/0279805 | A1 | 9/2017 | Diaz-Cuellar et al. | |
| 2018/0278603 | A1 | 9/2018 | Yabe | |
| 2019/0007214 | A1* | 1/2019 | Johnson | H04L 9/3234 |
| 2019/0245848 | A1* | 8/2019 | Divoux | H04L 63/0815 |
| 2020/0076791 | A1* | 3/2020 | Kishimoto | H04L 63/123 |
| 2021/0112407 | A1* | 4/2021 | Shin | H04W 12/50 |
| 2022/0035924 | A1* | 2/2022 | Behnck | G06F 21/64 |

OTHER PUBLICATIONS

"Cambridge Analytica," Wikipedia, The Free Encyclopedia, Sep. 13, 2019, <https://en.wikipedia.org/wiki/Cambridge_Analytica> [retrieved Sep. 13, 2019], 10 pages.
"FREAK," Wikipedia, The Free Encyclopedia, Mar. 9, 2019, <https://en.wikipedia.org/wiki/FREAK> [retrieved Sep. 13, 2019], 3 pages.
Hardt, D., "The OAuth 2.0 Authorization Framework," Request for Comments: 6749, Standards Track, Oct. 2012, 77 pages.
"Logjam (Computer Security)," Wikipedia, The Free Encyclopedia, Jun. 24, 2019, <https://en.wikipedia.org/wiki/Logjam_(computer_security)> [retrieved Sep. 13, 2019], 4 pages.
International Search Report and Written Opinion dated Feb. 1, 2021, for Application No. PCT/US2020/048017, filed Aug. 26, 2020.
European Invitation to Pay Additional Fees and Receipt of Partial Search Report for Patent Application No. PCT/US20/48017 dated Nov. 24, 2020, 10 pages.

* cited by examiner

SECURE AUTHORIZATION FOR SENSITIVE INFORMATION

BACKGROUND

Organizations spend significant resources to protect data, whether it be their internal operational data, customer data, or otherwise. At the same time, the systems that support organizations' operations become increasingly complex, causing techniques for protecting data to likewise evolve accordingly. Various mechanisms are employed to allow various system components (e.g., various services playing respective roles in the operation) to interoperate with one another while maintaining high levels of security. Such mechanisms, however, often come with costs as organizations seek to balance improving system interoperability with maintaining information security. Simplifying how systems interact with one another, for example, can require significant resources to ensure that such simplifications do not inadvertently create vulnerabilities that can result in unauthorized system access. At the same time, the complexity involved in preventing unauthorized access can inadvertently result in system downtime or other adverse consequences if a component in a distributed system malfunctions.

BRIEF DESCRIPTION OF THE DRAWINGS

Various techniques will be described with reference to the drawings, in which.

DETAILED DESCRIPTION

Figure 1:
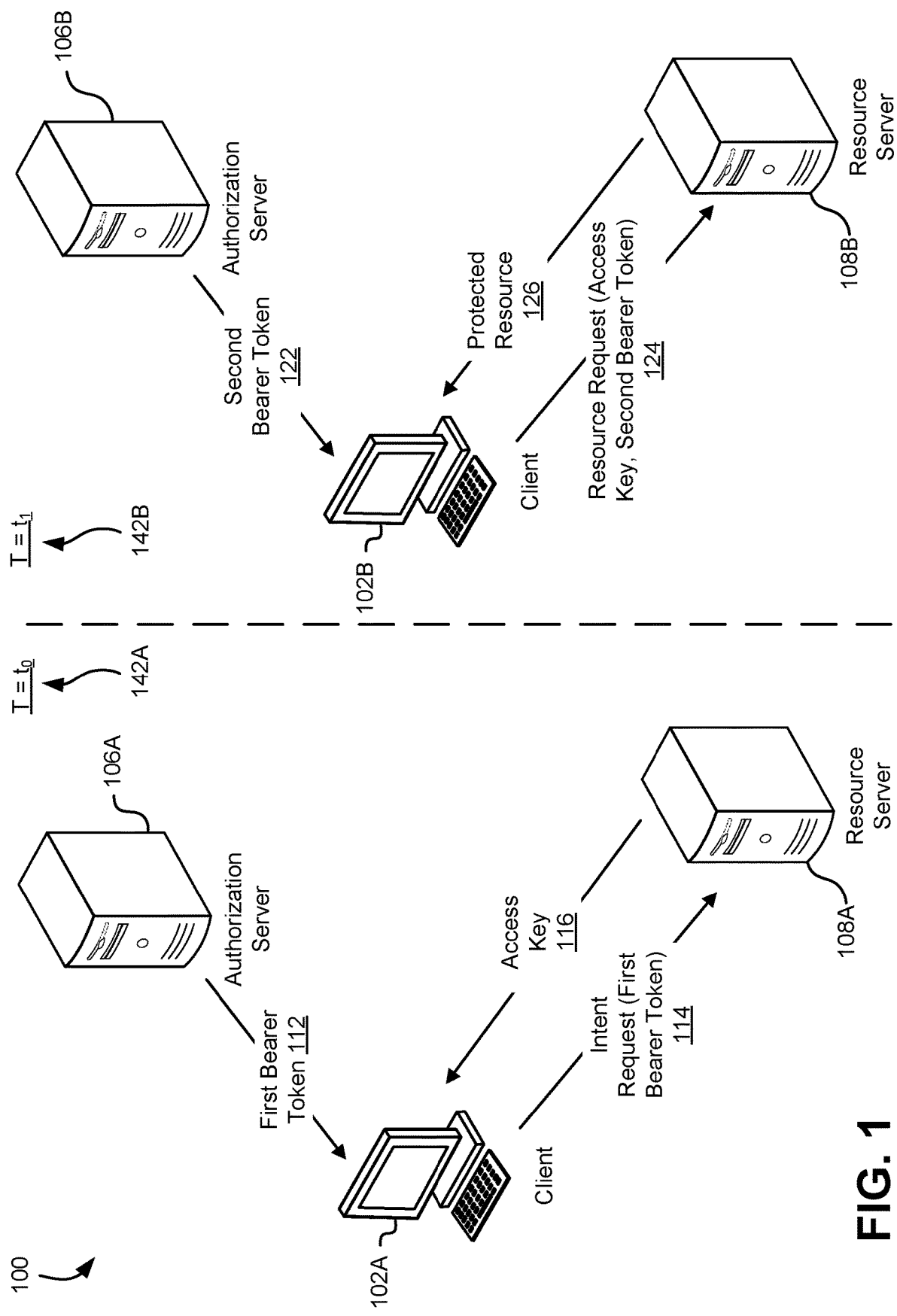
FIG. 1 shows an illustrative example environment between a client device, a resource server, and an authorization server for protecting access to a protected resource.

Techniques described and suggested herein include systems, methods, and processes for securing sensitive information and other protected resources to ensure that unauthorized access to sensitive information and other protected resources is limited. This is ensured, at least in part, by utilizing a process where entities attempting to access protected resources register an intent prior to requesting access to the protected resource. In various examples described in greater detail below, a user transmits its intent request using an Application Programming Interface (API) call including an access token, bearer token, or other authorization information provided by an authorization server. The intent request is transmitted to a resource server that maintains or has access to the protected resource. For example, the resource server may host a database containing names, addresses, credit card numbers, and other personal identification information of individuals. In response to the intent request, the resource server may generate an access key or other cryptographically protected information that may be used in a separate request to access the protected information.

In one example, the resource server generates the access key using information obtained from the intent request and information maintained by the server. Specifically, the resource server may generate the access key by at least obtaining identification information from a bearer token included in the request, a pair of timestamps, and resource identification information (e.g., the secure resource the user is attempting to access that is indicated in the intent request) and encrypting or otherwise cryptographically protecting this information. Cryptographically protecting the access key may include, in some examples, using the resource server's public key to encrypt the pair of timestamps, the identification information (e.g., secure resource and/or user), and the bearer token. As described in greater detail below, cryptographically protecting the access key in this manner allows the resource server to verify the access key included in an access request and determine that the user submitting that access request is authorized to access the secured resource.

In various examples described below, OAuth (Open Authorization) is used to provide token-based authentication and authorization. In some examples, a user attempting to access the protected resource and/or server may obtain a first bearer token from an authentication server (e.g., by sending a refresh token request to the authentication server). This first bearer token may be included in the intent request and used to generate the access key which is transmitted to the user. At a point in time after obtaining the access key, the user may obtain a second bearer token and transmit an access request to the resource server including the second bearer token and the access key. The resource server may verify the information included in the access key (e.g., timestamps, resource identifiers, client identifiers, first bearer token etc. . . . ) as well as compare information in the second bearer token to the first bearer token. For example, the resource server can compare the two bearer tokens (e.g., first and second bearer tokens) to determine whether the two bearer tokens are distinct. If the resource server determines that the access request includes the appropriate authorization (e.g., the access key and the second bearer token are valid and indicate that access to the protected resource is authorized), the resource server may provide the protected resource in response to the access request. Using some of the techniques described herein, the resource server may ensure that users cannot access protected resources until at least two conditions are satisfied: first that the current time is within a range specified by the resource server (e.g., via the pair of timestamps) and second that a new access token has been obtained (e.g., the second bearer token). In this manner, mere access to or possession of a bearer token is insufficient to obtain access to the protected resource, but rather stricter conditions that are more difficult for an unauthorized entity to meet are utilized.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: preventing and/or protecting access to resources using a single access token that may have been stolen or otherwise obtained without the correct authorization, preventing attackers from accessing resources without warning, allowing service provider systems to examine requests and/or call patterns, and validate the requests and/or calls. Furthermore, the embodiments described herein mitigate vulnerabilities in various encryption protocols, such as, Transport Layer Security (TLS) or other encrypted communication protocols. Specifically, when vulnerabilities in these encryption protocols are discovered, users are at risk of man-in-the-middle (MITM) attacks which may expose access tokens and/or other authentication information that is then used by attackers to obtain access to protected resources. These vulnerabilities are mitigated by various aspects of the present disclosure such as requiring additional access tokens, requiring users to register an intent, and specifying an interval of time during which access requests can be made.

FIG. 1 illustrates an example environment 100 including a client device 102A and 102B, a resource server 108A and 108B, and an authorization server 106A and 106B. In addition, FIG. 1 illustrates the environment 100 at two distinct intervals of time $t_0$ 142A and $t_1$ 142B. As such, the client device 102A and 102B, resource server 108A and 108B, and authorization server 106A and 106B, may be the same device at time interval $t_0$ 142A and $t_1$ 142B. For example, resource server 108A may be the same as resource server 108B but at a different point in time or, in some examples, the resource server 108A and the resource server 108B may be different servers (e.g., in the same fleet of web servers, perhaps behind a common load balancer). As illustrated in the example environment 100, an intent request 114 including a first bearer token may be transmitted to the resource server 108A indicating an intent to access one or more protected resources. The resource server 108A and 108B may include a web server for receiving requests and serving content as described in greater detail below in connection with FIG. 10. The intent request 114, as described in greater detail below, may be submitted by the client device 102A.

The client device 102A and 102B may include a variety of different computer systems and/or computing devices. Furthermore, the client device 102A and 102B may include physical computing resources, virtual computing resources, or a combination of both. In general, the client device 102A and 102B may include any computing devices capable of communicating with other computing devices described in the present disclosure (e.g., the resource server 108A) to obtain access to a protected resource 126. In one example embodiment, the client device 102A is a third party service attempting to access customer contact information of a computing resource service provider which operates the resource server 108A and 108B. Furthermore, the client device 102A and 102B may include an electronic client device, which includes any appropriate device operable to send and/or receive requests, messages, or information over an appropriate network and convey information back to a user of the device as described in greater detail below in connection with FIG. 10.

In an example implementation, the intent request 114 may be generated by the client device 102A using an application programming interface (API) that receives user input/instructions from a user interface. In various embodiments, the user interface may include graphical user interfaces (GUIs), web based interfaces, and/or sets of remote procedure calls (RPCs) corresponding to interface elements, voice commands, messaging interfaces in which the interface elements correspond to messages of a communication protocol, and/or suitable combinations thereof. As described in the present disclosure, requests and responses may be submitted using various suitable communication protocols, such as Hypertext Transfer Protocol ("HTTP"), HTTP 2.0, File Transfer Protocol ("FTP"), TLS, and other communications protocol, and in various formats, eXtensible Markup Language (XML), JavaScript Object Notation (JSON), or other formats. In addition, the requests and responses may be encoded, for example, using Base64 encoding, and/or encrypted with a cryptographic key including symmetric and asymmetric encryption protocols.

In an example implementation, the client device 102A obtains a first bearer token 112 from the authorization server 106A. The first bearer token 112 may be obtained in response to a refresh token request (not shown in FIG. 1 for simplicity) provided by the client device 102A to the authorization server 106A in accordance with the OAuth protocol or variations thereof. Although some of the embodiments of the present disclosure utilize bearer tokens as described in the OAuth protocol, various other access tokens and/or authorization information may be used in connection with the embodiments. Other examples of authentication tokens that may be used in connection with the present embodiments include Virtual Private Network (VPN) tokens, Yubikey, Security Assertion Markup Language (SAML), security policies, Single Sign On (SSO) tokens, federated identity services, and other suitable protocols and/or systems for providing authentication. In various embodiments, communication (e.g., requests and responses) between the client device 102A and 102B, the resource server 108A and 108B, and the authorization server 106A and 106B may be performed over a network. The network may include the Internet, a local area network ("LAN"), a wide area network ("WAN"), a cellular data network and/or other data network. Furthermore, the network may be an internal trusted network or, in other implementations, the network may be an external network. Furthermore, the authorization server 106A and 106B may include an application server as described in greater detail below in connection with FIG. 10.

In some embodiments, the intent request 114 may be received by the resource server 108A at a request interface executed by the resource server 108A. Furthermore, the resource server 108A and 108B may include a variety of different computer systems and/or computing devices. For example, the resource server 108A and 108B may include physical computing resources, virtual computing resources, or a combination of both. In general, resource server 108A and 108B may include any computing devices capable of restricting access to protected resources using the processes and methods described in the present disclosure. In one example embodiment, the resource server 108A is a server computer system of a computing resource service provider that maintains protected resources on behalf of the service provider and within a service provider environment. In some embodiments, the protected resource 126 includes access to an operation and/or function of the resource server 108B or other computer system such as an application server as described in greater detail below in connection with FIG. 10. In one example, the protected resource 126 includes causing the resource server 108B to perform an operation on data and return a result to a third party (e.g., an entity other than the authorization server 106B or the client device 102B illustrated in FIG. 1). Other examples may include calculating a result, storing data, causing a mechanical device to operate mechanically, returning data, or other operation that may be secured or otherwise restricted to authorized access and/or users.

Returning to the example above, the client device 102A obtains the first bearer token 112 from the authorization server 106A. In various embodiments, the authorization server 106A and 106B includes a variety of different computing systems capable of providing authentication information (e.g., bearer tokens, access tokens, policy information, etc. . . . ) for use by the resource server 108A and 108B. Similarly, the authorization server 106A and 106B may include physical computing resources, virtual computing resources, or a combination of both. Furthermore, the authorization server 106A and 106B may be operated by the same computing resource service provider operating the resource server 108A and 108B, or operated by an entity associated with the client device 102A and 102B, or operated by a third party distinct from both the computing resource service provider and the associated with the client device 102A and 102B.

In various examples, when attempting to access the protected resource 126, the client device 102A is redirected to the authorization server 106A to perform a sign-on operation or other operation to obtain authorization to access the protected resource 126. In such examples, the authorization server 106A determines whether the user is authorized to access the protected resource 126 and, as a result of determining the client device 102A (e.g., a user operating the client device 102A) is authorized to access the protected resource 126, provide the client device 102 with the first bearer token 112 and a refresh token. The refresh token may be used by the client device 102B to obtain the second bearer token 122 at time $t_1$ 142B. The first bearer token 112 and the second bearer token 122 may be an opaque string that does not provide information to the client device 102A or 102B or a user operating the client device 102A or 102B. In some embodiments, the authorization server 106A and 106B will issue tokens that are a short string of hexadecimal characters. In yet other embodiments, the authorization server 106A and 106B generates structured bearer tokens such as JSON Web Tokens. In one example the client may want to obtain highly confidential customer data that is stored on a remote server. To obtain the data, the client device 102A obtains the first bearer token 112 and resisters the intent request 114 to obtain a plurality of customer shipping address from the resource server 108B. The client device 102A and 102B may perform these types of operations periodically or aperiodically to obtain shipping information or other information associated with customers in order to complete customer orders. In such embodiments, the client 102A and 102B may be operated by an entity providing goods or services to customers through another entity that maintains customer information (e.g., as protected resources maintained by the resource server 108B). Furthermore, the other entity may protect the customer information by maintaining one or more conditions for accessing the customer information as described in the present disclosure.

In various embodiments, the resource server 108A generates an access key 116 in response to the intent request 114 including the first bearer token 112. In some embodiments, the intent request 114 indicates that the client device 102B will attempt to access the protected resource 126 at a point in time later represented in FIG. 1 as time $t_1$ 142B. The access key 116 may be generated by at least selecting a pair of timestamps. The pair of timestamps may be used by the resource server 108B to determine a window of time during which access requests from the client device 102A and 102B are valid. For example, when determining whether to provide the client device 102B with access to the protected resource 126, the resource server 108B determines whether the current time (e.g., time $t_1$ 142B) is within the interval of time indicated by the pair of time stamps. Although a pair of timestamps is described, the process may be performed with a single timestamp. In such embodiments, the access key 116 includes a single timestamp and the resource server 108B determines if the current time (e.g., time $t_1$ 142B) is after the time indicated in the single timestamp. In other examples, the interval of time indicated by the timestamp(s) includes a 5 minutes window 2 hours after the access key 116 is provided. In yet other examples, the timestamp(s) indicate an access window one day after the access key 116 is provided. The access window indicated by the timestamp(s) may be set far enough in the future such that the first bearer token 112 (or the authorization information used in other embodiments) has expired prior to the interval of time during which the protected resource 126 is accessible.

Furthermore, other information may be used instead of timestamps including any string, data, or other information which the resource server 108A and 108B can use to determine an interval of time during which access to the protected resource by the client device 102B is permitted. In yet other embodiments, the client device 102A may submit timestamp(s) or other information indicating the interval of time the client device 102A will attempt to access the protected resource. In addition, the resource server 108B, in various embodiments, can pre-compute, cache, or otherwise prepare all or part of the response (e.g., the response including the protected resource 126) to the client device 102B. As a result of the client device 102A registering an intent to access the protected resources at an interval of time in the future, the resource server 108B and/or other computer systems participating in the process described in the present disclosure, obtains information regarding an expected load at a point of time in the future (e.g., during the interval of time). Therefore, various load management techniques may be used in connection with the protocol described in the present disclosure based at least in part on information obtained from the intent request or by at least generating the intent request.

Returning to the example above, in an embodiment, the resource server 108A creates an access key including the pair of timestamps, the first bearer token 112, an identifier of the protected resource 126, and a client identifier. In various embodiments, the identifier of the protected resource includes information useable by the resource server 108B to identify the protected resource 126 and verify that the intent request 114 and a resource request 124 are directed to the same protected resource 126. The identifier of the protected resource 126 may include the API path indicated in the intent request 114, a storage location, a file path, a key (e.g., a key used in a key-value store), a database query, a network address, a hash value, or any other information suitable for identifying the protected resource 126. The client identifier, in various embodiments, is obtained from the first bearer token 112. The client identifier may include any information suitable for identifying the client device 102A and 102B, a user, an identity, an organization, an account, a role, or combination thereof. Furthermore, the client identifier may include any information used by the resource server 108A and 108B to determine whether an entity providing the intent request 114 matches the entity providing the resource request 124.

In various embodiments, the pair of timestamps, the first bearer token 112, the identifier of the protected resource 126, and the client identifier are cryptographically protected to create the access key 116. As described below in connection with FIG. 4, various methods and/or encryption algorithms may be used to cryptographically protect the access key 116. In one example, the pair of timestamps, the first bearer token 112, the identifier of the protected resource, and the client identifier are encrypted with a public key associated with the resource server 108A to generate the access key. Furthermore, in various embodiments, the operations to cryptographically protect this information and generate the access key 116 are performed by one or more other computer systems. For example, the resource server 108A may transmit the pair of timestamps, the first bearer token 112, the identifier of the protected resource, and the client identifier to a cryptography service (not shown in FIG. 1) (also referred to as a key management service) which performs the encryption operations and returns the access key 116. The access key 116 may then be provided to the client device 102A in response to the intent request 114.

In yet other embodiments, the resource server 108A or other computer systems (e.g., the cryptography service) generates a cryptographic key using information associated with the client device 102A and the protected resource. For example, a cryptographic key is generated using the combination of the client identifier and the resource identifier. This key can also be used to encrypt the protected resource when the protected resource is transmitted to the client device 102B. Generating a key in this manner reduces the use of other cryptographic keys, such as the resource server's 108A and 108B keys or the cryptography service's keys. In addition, this provides a unique key for each client/resource combination and may increases security of the system. In yet other embodiments, the key is obtained from a table based at least in part on various parameters described above (e.g., the client identifier and the resource identifier).

In various other examples, as an alternative or in addition to the use of timestamp(s), the client device 102A provides a network address of the client device 102B which will submit the resource request 124. The network address may include an Internet Protocol address, Media Access Control (MAC) address, string, hexadecimal values, hash, or any other information suitable for identifying the client device 102B. In various embodiments, the network address of the client device 102A submitting the intent request must be different than the network address of the client device 102B submitting the resource request. Furthermore, the resource server 108B may verify the network address of the client device 102B based at least in part on information included in the access key 116. In such embodiments, an attacker would have to compromise the network address of both the computing device submitting the intent request and the computing device submitting the resource request.

Turning now to time $t_1$ 142B, the client device 102B submits the resource request 124 including the second bearer token and the encrypted access key. The resource server 108B may verify that at least two conditions are satisfied prior to providing access to the protected resource 126: First, that the current time is within a range specified by the resource server 108A (e.g., based at least in part on the pair of timestamps); and second, that a new bearer token (e.g., the second bearer token 122) has been obtained by the client device 102B. The resource server 108B verifies that these conditions are satisfied using a process described below in connection with FIG. 8. For example, the resource server 108B decrypts the access key 116 included in the resource request 124. Decryption of the access key 116 may include various operations to obtain plain text representation of the information included in the access key as described above. In yet other embodiments (e.g., where the access key 116 includes a digital signature), the decryption operations include verifying the digital signature.

In various embodiments as described above, the resource server 108B, after decrypting the access key 116, verifies that time $t_1$ 142B is within an interval of time indicated by the pair of timestamps. The interval of time may be determined by the resource server 108A such that the interval of time is large enough to allow for difference between clock values of the client device 102B and the resource server 108B. For example, if the interval of time is too short (e.g., 10 milliseconds) this may not account for clock drift between computing devices and thereby prevent access to the protected resource 126. Alternatively, if the interval of time is too long (e.g., 5 hours) this may increase the likelihood that an attacker can spoof an authorized access request. Returning to the example above, the resource server 108B validates that the second bearer token 122 included in the resource request 124 is different than the first bearer token 112 obtained from the access key 116. In various embodiments, the resource server 108B, further validates that the identifier of the resource included in the resource request 124 matches the identifier of the resource obtained from the access key 116. In addition, the resource server 108B may also validate that the client identifier obtained from the second bearer token 122 matches the client identifier obtained from the first bearer token 112 included in the access key 116.

As described in greater detail below, after validating the access key 116, second bearer token, and/or determining the client device 102B is authorized to access the protected resource 126, the resource server 108B may provide the client device 102B with access to the protected resource 126. In various embodiments, providing the client device 102B with access to the protected resource 126 includes transmitting an encrypted version of the protected resource 126 to the client device 102B. In one example embodiment, the protected resource 126 is encrypted with the first bearer token 112. Specifically, a Key Derivation Function (KDF) or similar algorithm may be used to generate cryptographic keys based at least in part on information described in the present disclosure such as the bearer tokens, client identifiers, resource identifiers, and/or combinations thereof. In one example, a cryptography service utilizes one or more non-secret parameters (e.g., bearer tokens, client identifiers, or resource identifiers) to derive one or more cryptographic keys from a common secret value. Furthermore, the common secret value may be shared with the client device 102B so that the client device is capable of generating the one or more cryptographic keys.

The processes described in connection with FIG. 1 may be performed asynchronously, insomuch that, the intent request 114, resource request 124, responses, refresh requests (e.g., request for additional bearer tokens or other authentication information), and data processing may be performed at various times and may not be dependent upon completion and/or performance of any prior operations. For example, the resource server 108B validates the second bearer token 122 in parallel with validating the identifier of the protected resource 126 included in access key 116 and the resource request 124. In this example, the resource server 108B may transmit a verification request to the authorization server 106B to validate the second bearer token 122 while comparing the identifier of the protected resource 126 obtained from access key 116 and the resource request 124 to validate that the identifier of the protected resource 126 obtained from each location matches. Furthermore, although the process described in connection with FIG. 1 include timestamp(s), the process may be performed without timestamp(s). For example, the interval of time during which access to the protected resource is permitted may be determined based at least in part on the time the intent request was provided by the client device 102A to the resource server 108A. As a result, the access key 116, in various embodiments, does not include a timestamp(s).

Although FIG. 1 shows a single intent request with a corresponding access request, any number of intent requests and access requests may be used as described herein. For example, the client device 102A may submit a single intent request (e.g., intent request 114) and subsequently provide a plurality of access requests during an interval of time in the future (e.g., $t_1$). In yet other examples, in response to the intent request 114, the resource server 108A determines a plurality of timestamps indicating a plurality of intervals in the future during which the client device 102B is authorized to submit access requests. Furthermore, although an interval of time is used as a condition for submitting an authorized access request other information may be used as a condition for access. In some embodiments, an intent request is submitted for a specific type of API call or type of request. For example, the intent request 114 specifies an API call to obtain shipping address from a database. As a result, the resource server 108B may only fulfill resource requests satisfying the condition (e.g., API calls to obtain shipping addresses from a database). In addition, such conditions may be combined with other conditions described herein (e.g., time).

Figure 2:
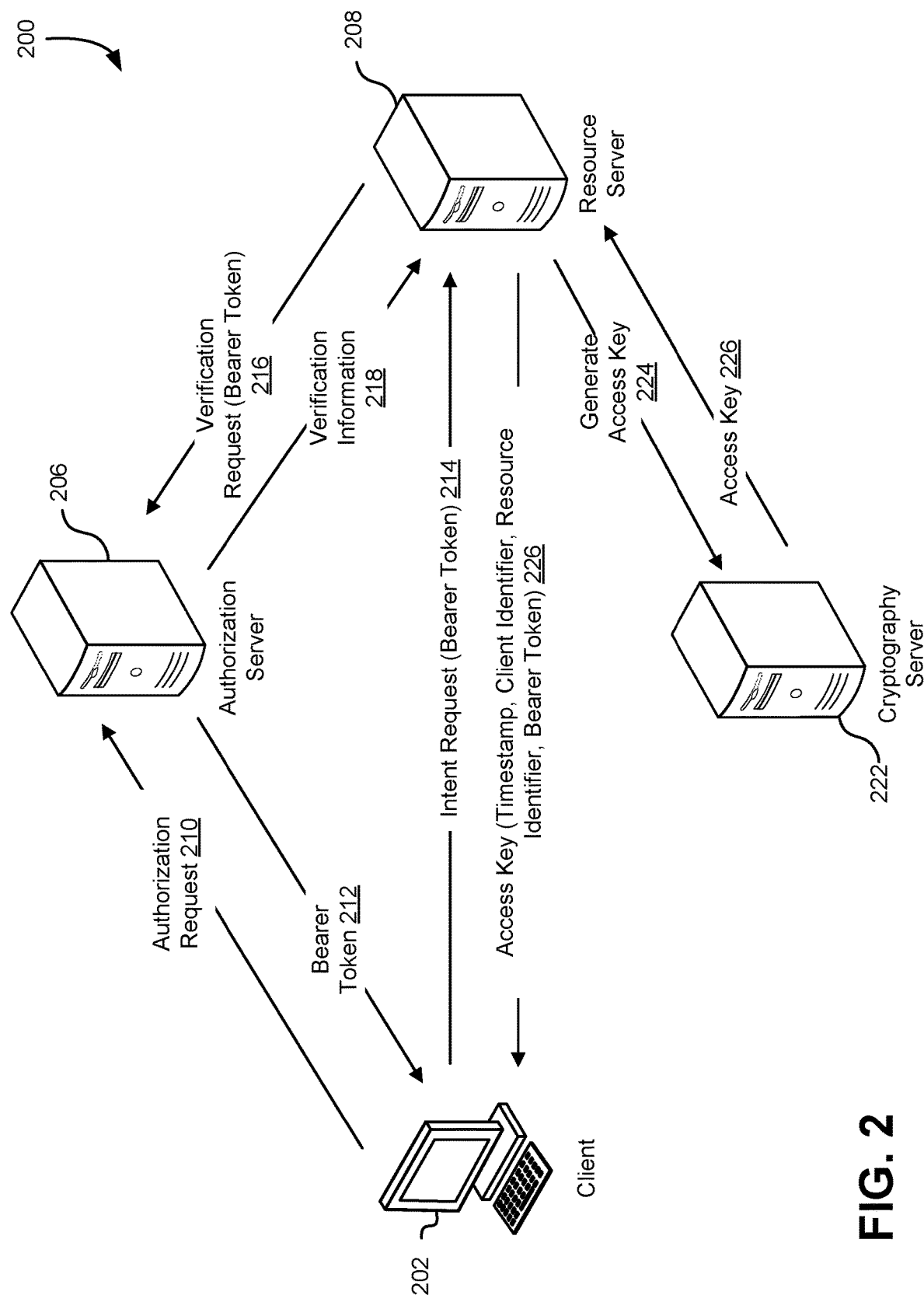
FIG. 2 shows an illustrative example environment between a client device, a resource server, and an authorization server for providing an intent request.

FIG. 2 illustrates an example environment 200 including a client device 202, an authorization server 206, a resource server 208, and a cryptography server 222. The client device 202, the authorization server 206, and the resource server 208 may include various computing resources as described above in connection with FIG. 1. Furthermore, the environment 200 illustrated in FIG. 2 shows various embodiments in which the client device 202 provides an intent request 214 to the resource server 208. The intent request 214, as discussed in the present disclosure, may be a prerequisite for a resource request (e.g., as shown below in FIG. 3) to obtain access to a protected resource.

As illustrated in FIG. 2, the client device 202 may initially obtain a bearer token 212 to include in the intent request 214. The bearer token 212, in various embodiments, includes access tokens generated and obtained in accordance with an OAuth protocol or version thereof. However, other types of authentication information may be used in accordance with the present disclosure as described above. In order to obtain the bearer token 212 (or other authentication information), the client device 202 may transmit an authorization request 210 to the authorization server 206. For example, an OAuth client executed by the client device 202 generates the authorization request 210 in response to one or more inputs obtained from a user operating the client device 202. In another example, the client device 202 is redirected to (e.g., through a log-in page of a website) to the authorization server 206 in order to provide the authorization server 206 with the authorization request 210.

At some point in time after obtaining the bearer token 212, the client device 202 may generate the intent request 214 and transmit the intent request 214 to the resource server 208. In an embodiment, the client device 202 generates the intent request 214 by making an API call to the resource server 208 identifying the protected resource and including the bearer token 214. In yet another embodiment, the client device 202 generates the intent request 214 by making an API call to the resource server 208 identifying the protected resource. The resource server 208, in response to obtaining the intent request 214, redirects the client device 202 to the authorization server 206 to obtain the bearer token 212.

In response to the intent request 214, the resource server 208, in various embodiments, verifies the bearer token 212 with the authorization server 206. For example, the resource server 208 transmits a verification request 216 to the authorization server 206 to validate the bearer token 212. In yet other embodiments (e.g., where authorization information is used), the resource server 208 may transmit a verification request 216 that does not include the authentication information. The verification request 216 may include a variety of different requests that cause the authorization server 206 to return, in response to the verification request 216, verification information 218 that indicates whether the client device 202 or a user associated with the client device 202 (including a user account or other identification information) is authorized to access the protected resources. In some embodiments, the verification information 218 includes authentication information (e.g., information verifying a purported identity), in addition to or as an alternative to, the authorization information.

Returning to the example above, the resource server 208, once the verification information 218 is obtained, may determine whether the verification information 218 indicated that the client device 202 is authorized to access the protected resource. If the verification information 218 indicates that the client device 202 is authorized, the resource server 208 may generate an access key 226 to allow the client device 202 to access the protected resource during a specified interval of time as described above. However, if the verification information 218 indicates that the client device 202 is not authorized to access the protected resource, the resource server 208 may deny the request. In some embodiments, if the verification information 218 indicates that the client device 202 is not authorized to access the protected resource, the resource server 208, in addition to denying the request, may perform one or more remedial operations. For example, the resource server 208 may notify an administrator associated with the protected information. At various points in the process of verifying and/or validating the client device 202, the resource server 208 may perform the one or more remedial operations in response to a failed verification and/or validation. For example, as discussed in greater detail below in connection with FIG. 8, if the access request fails one or more checks, the resource server 208 may, in addition to or as an alternative to denying the access request, perform the one or more remedial actions in order to mitigate the possibility of an attack.

However, if the client device is authorized to access the protected resources, the resource server 208 may transmit a generate access key request 224 that, when received by the cryptography server 222, cause the access key 226 to be generated. As illustrated in FIG. 2, in various embodiments, the resource server 208 may cause the cryptography server 222 to generate the access key 226. The access key 226 may include cryptographically protected information as described above in connection with FIG. 1. In addition, the cryptography server 222 may include a variety of different computing resources suitable for performing cryptographic operations in connection with the information included in the access key. In one example, the cryptography server 222 includes a set of computing resources implementing a cryptography server of a computing resource service provider. Furthermore, the computing resources implementing the cryptography server 222 may include physical computing resources, virtual computing resources, or a combination thereof. The cryptography server 222, in various embodiments, maintains cryptographic material (e.g., cryptographic keys) used to generate the access key 226. Furthermore, the cryptographic material may be maintained such that the cryptographic material is inaccessible to one or more other computer systems (e.g., the client device 202).

In various embodiments, the generated access key request 224 may include timestamp information, client identification information, protected resource identification information, authentication information, and/or information indicating how to obtain that data to include in the access key 226. For example, the generated access key request 224 may include a link and/or location information to enable the cryptography server 222 to obtain data used to generate the access key. As described above, the access key 226 may be generated, in one embodiment, by at least appending or concatenating one or more timestamps, a client identifier (e.g., obtained from the bearer token 212), a protected resource identifier, and the bearer token 212 and then cryptographically protecting the result. Once the access key 226 is generated, the cryptography server 222 may return the access key 226 to the resource server 208. Although the cryptography server 222 is shown as a separate entity in FIG. 2, in various embodiments, the operation performed by the cryptography server 222 may be performed in whole or in part by the resource server 208. Once the resource server 208 has obtained the access key 226, the resource server 208 may provide the access key 226 to the client device 202 in response to the intent request 214.

In addition to generating or requesting the access key 226, the resource server 208 may perform various load management operations. As described above, as a result of the client device 202 submitting the intent request 214, the resource server 208 has information regarding potential future load demands (e.g., processing and fulfilling resource requests as described in greater detail below in connection with FIG. 3). In various embodiments, the resource server 208 may cache the protected resource and/or pre-compute responses. In addition, various load balancing and/or scaling operations may be performed based at least in part on the intent request obtained from one or more client devices. For example, the client device 202 may perform a batch operation and submit one or more intent requests to obtain 500 customer addresses to complete customer orders. As a result, the resource server 208 may determine that in 2 hours (e.g., the time interval in the future indicated in the access key 226) the resource server 208 will receive one or more resource requests for the 500 customer addresses. Therefore, in various embodiments, the resource server 208 performs one or more load management operations (e.g., scale up, cache data, pre-compute response) in advance of the interval of time indicated in the access key 226.

Figure 3:
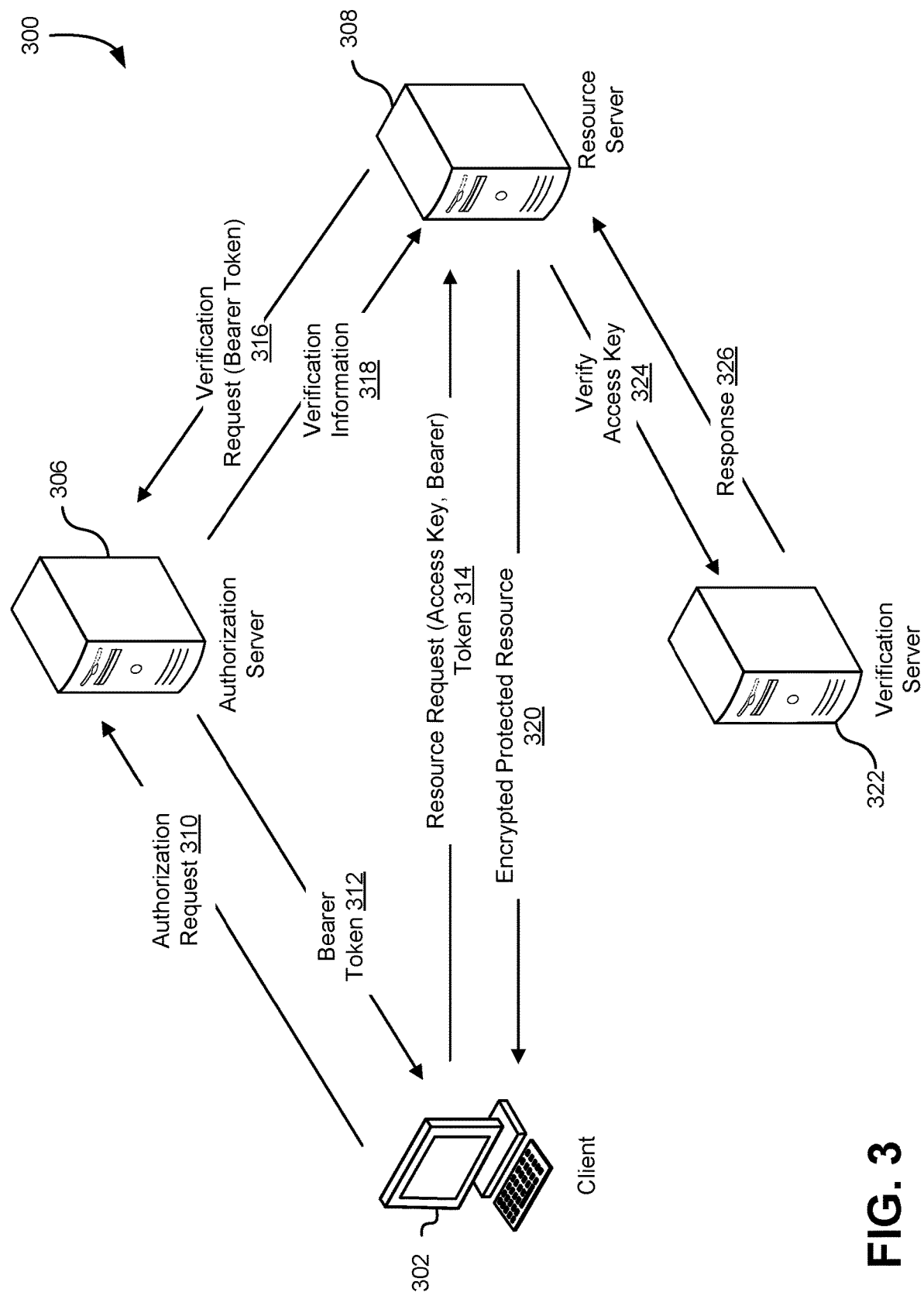
FIG. 3 shows an illustrative example environment between a client device, a resource server, and an authorization server for requesting access to a protected resource.

FIG. 3 illustrates an example environment 300 including a client device 302, an authorization server 306, a resource server 308, and a verification server 322. The client device 302, the authorization server 306, and the resource server 308 may include various computing resources as described above in connection with FIG. 1. Furthermore, the environment 300 illustrated in FIG. 3 shows various embodiments in which the client device 302 provides a resource request 314 to the resource server 308 to obtain access to an encrypted protected resource 320. In various embodiments, the client device 302 obtains a bearer token 312. The client device 302 may obtain the bearer token as described above in connection with FIG. 2; however, the bearer token 312 may be a different bearer token than that illustrated in FIG. 2. For example, the client device 302 transmits an authorization request 310 to the authorization server 306. The authorization request 310 may include a refresh token provided by the authorization server 306 in response to a previous authorization request in accordance with one or more versions of the OAuth protocol.

In various embodiments, once the client device 302 obtains the bearer token 312, which may be a second or subsequent bearer token obtained after the bearer token 212 as described above in connection with FIG. 2, the client device 302 generates a resource request 314 including the access key (e.g., the access key obtained in response to an intent request as described above in connection with FIG. 2) and the bearer token 312. The resource request 314 may include an API call or other suitable requests such as those described above. The resource request 314 may be directed to the resource server 308 that contains the encrypted protected resource 320 the client device 302 is seeking access to. In yet other embodiments, the resource request 314 is directed to an interface (e.g., service front-end) which is responsible for directing the resource request 314 to the appropriate resource server. Furthermore, the encrypted protected resource 320 may be generated by encrypting a protected resource prior to providing the client device 302 access.

In response to the resource request 314, the resource server 308, in several embodiments, determines whether the conditions for access to the encrypted protected resource 320 are satisfied. The resource server 308 may transmit a verification request 316 including the bearer token 312 to the authorization server 306 to determine whether the client device 302 is authorized to access the encrypted protected resource 320. In addition, the resource server 308 may also transmit a request to the verification server 322 to verify the access key 324. Verification of the bearer token and the verification information 318 returned in response to the verification request may be performed as described above in connection with FIG. 2.

Turning now to the request to verify the access key 324, the resource server 308 may transmit the access key and the bearer token 312 to the verification server 322. The verification server 322, in various embodiments, performs a process, such as the process 800 described in greater detail below, to validate the access key and determine if the client device 302 is authorized to access the protected resource. Although the authorization server 306 and the verification server 322 are shown in FIG. 3 as separate entities, all or some of the operations performed by the authorization server 306 and the verification server 322 may be performed by the resource server 308. In addition, the authorization server 306 and the verification server 322 may be components of the resource server 308. In addition, the verification server 322 may include a variety of different computing resources suitable for performing verification operations in connection with the access key and the information included in the access key. In one example, the verification server 322 includes physical computing resources, virtual computing resources, or a combination thereof.

The verification server 322, in some embodiments, causes a cryptography server to decrypt the access key prior to verifying the information included in the access key (e.g., timestamps, bearer token, client identifier, and/or resource identifier). In yet other embodiments, the verification server decrypts or otherwise verifies the access key. For example, the verification server 322 may verify a digital signature included in the access key. The digital signature generated based at least in part on the information included in the access key (e.g., timestamps, bearer token, client identifier, and/or resource identifier). The verification server 322 may perform the process 800 described in greater detail below in connection with FIG. 8, to generate a response 326 indicating whether the client device 302 is authorized to access the protected resource. Furthermore, verifying the access key may include verifying that one or more of the conditions described above in connection with FIG. 1 are satisfied, for example, that the resource request 314 was transmitted within the interval of time as indicated by the one or more timestamps included in the access key. In another example, the verification server 322 verifies that the client identifier included in the bearer token 312 matches the client identifier included in a previous bearer token included in the access key.

In various embodiments, if the response 326 indicates that the client device 302 is authorized to access the encrypted protected resource 320, the resource server 308 then provides the client device with access to the protected resource. If however, the response 326 indicates that the client device is not authorized to access the protected resource, the resource server 308 may deny the request. As described above, the resource server 308 may generate a cryptographic key based at least in part on the client identifier and the resource identifier. This cryptographic key, in various embodiments, is used to encrypt the encrypted protected resource 320. Furthermore, the client device 302 can recreate the cryptographic key without additional information from the resource server 308 or other computer system.

Figure 4:
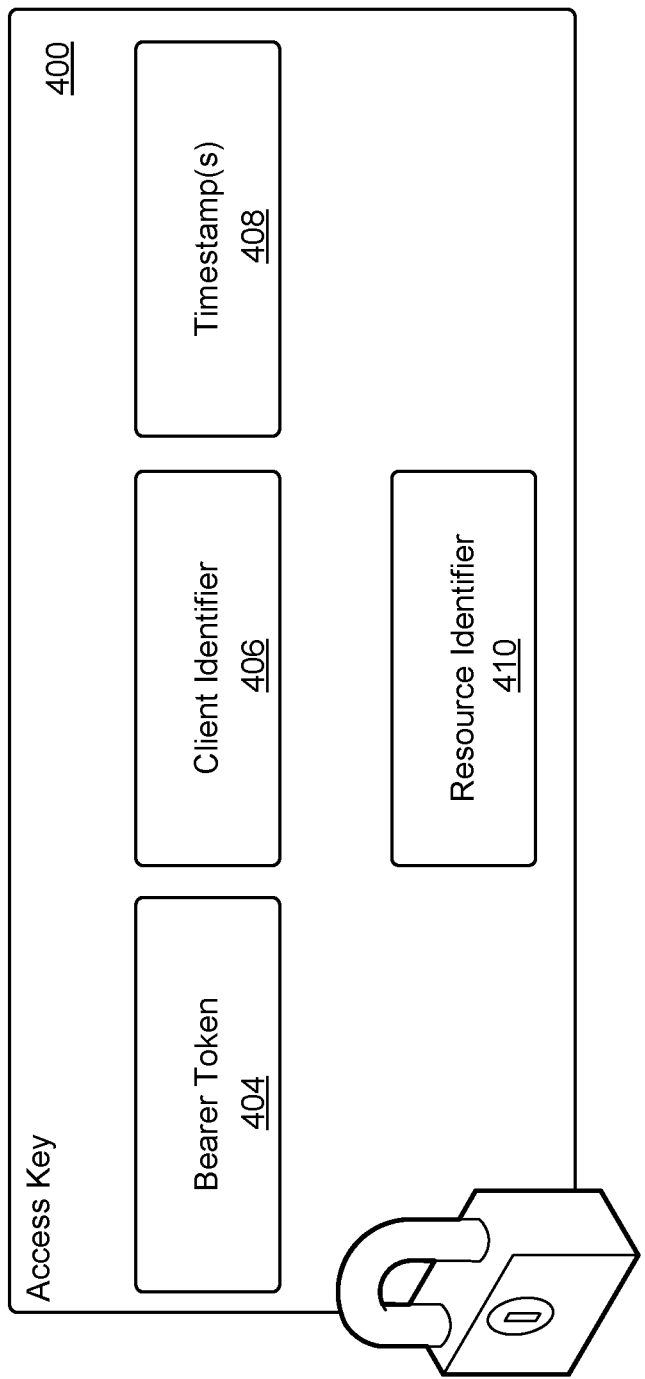
FIG. 4 shows an illustrative example of an access key used to protect access to a protected resource.

FIG. 4 illustrates an example access key 400 generated by a resource server or other computer system in response to an intent request. The intent request may include requests as described above or may include any request indicating an intent to access a protected resource at some point in time and/or window of time in the future. The access key 400, in various embodiments, includes a bearer token 404, a client identifier 406, one or more timestamps 408, and a resource identifier 410. Furthermore, the access key 400 may be cryptographically protected shown in FIG. 4 as a lock. The access key 400 may be returned in response to the intent request. For example, the access key 400 is transmitted to a client device responsible for submitting the intent request over a network. Transmission of the access key 400 may be over a cryptographically protected communication channel (e.g., TLS). In another example, the access key 400 is transmitted to an entity indicated in the intent request but not necessarily responsible for submitting the request. In addition, the access key 400 may not be directly transmitted but may be maintained in a storage location accessible to the client device.

The bearer token 404 may include authentication information included in the intent request. In some embodiments, the bearer token 404 is obtained from an OAuth server by an OAuth client using a refresh token. The bearer token 404 may include the client identifier 406 as well as policy and/or access information indicating whether a client, client device, or other entity is authorized to access the protected resource. The client identifier 406 may include alphanumeric or non-alphanumeric information that is used by the resource server, authorization server, or other computer system to identify the client device and/or user operating the client device. For example, the client identifier may include a network address, Media Access Control (MAC) address, string, hexadecimals values, hash, or any other information suitable for identifying an entity and/or computing device.

As described above, the one or more timestamps 408 may include information indicating an interval of time during which the protected resource is accessible to an authorized entity and/or computing device. The one or more timestamps may be generated by the computer system generating the access key 400, obtained from a third party, or included in the intent request. Furthermore, the interval of time may be defined by a protocol, negotiated between the client device and the resource server, randomly or pseudo-randomly generated, determined based at least on a current time, or determined based at least in part on other information accessible to the computer system generating the access key 400. In addition, multiple timestamps 408 may be used to indicate multiple access intervals.

In various embodiments, the access key 400 also includes the resource identifier 410. Similar to the client identifier 406, the resource identifier 410 may include a variety of different information suitable for identifying the protected resource. In one example, resource identifier 410 includes a file path or storage location of the protected resource. In another example, the resource identifier 410 includes a Uniform Resource Locator (URL) or Uniform Resource Identifier (URI). In yet other embodiments, the resource identifier 410 is the API path used by the client device to submit the intent request. The API path, in various embodiments, includes that text of the API call generated by the client device when submitting the intent request. As described above, the intent request may indicate the protected resource the client device is attempting to access.

Figure 5:
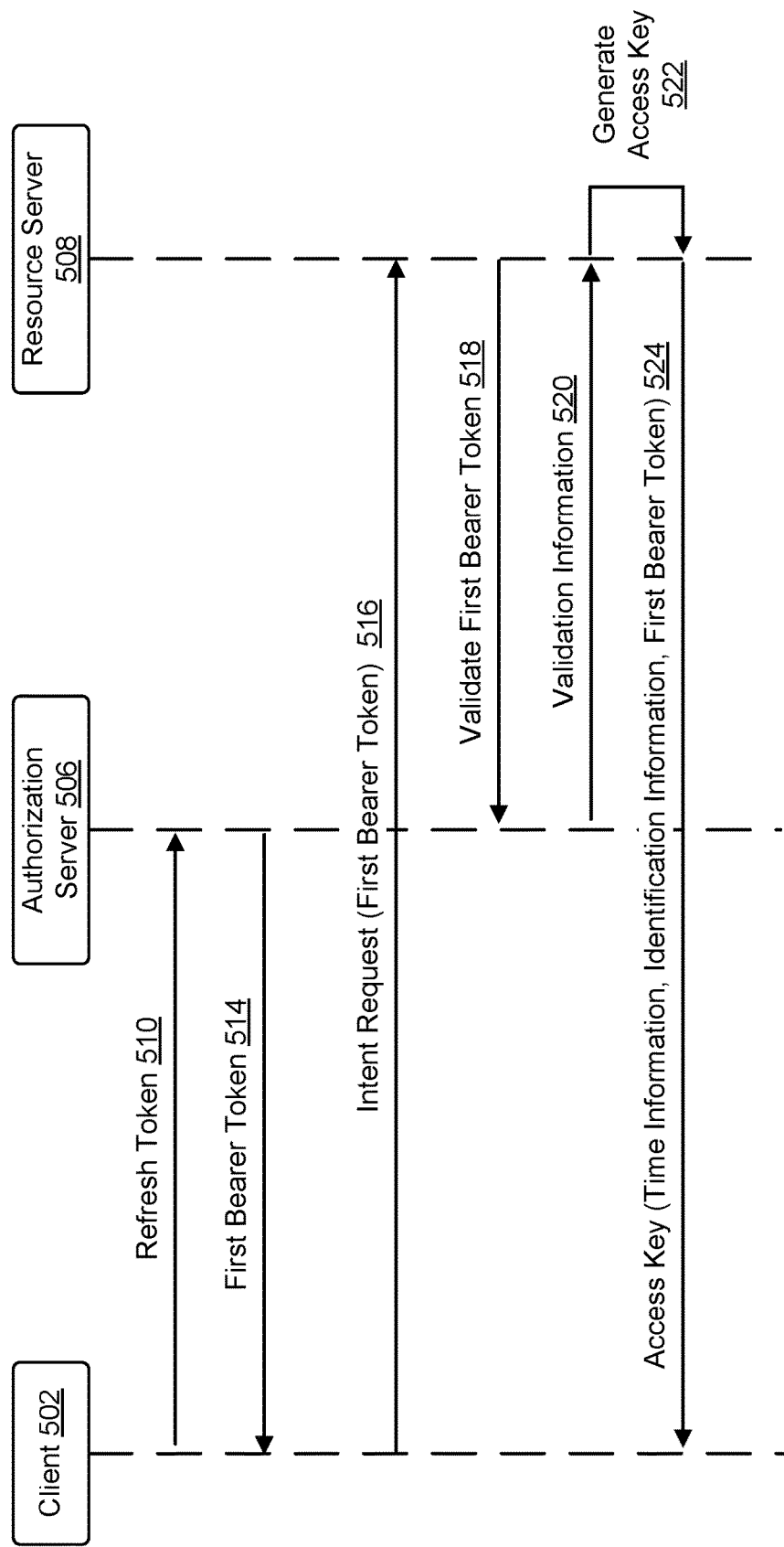
FIG. 5 shows an illustrative example of a process for providing an intent request and obtaining an access key.

FIG. 5 is a messaging diagram illustrating a process 500 in which a client device 502 communicates with an authorization server 506 to obtain a first bearer token 514 in order to use the first bearer token 514 to submit an intent request 516 to a resource server 508. In various embodiments, the client device 502, authorization server 506, and resource server 508 include computing resources as described above. Furthermore, the process 500 illustrated in FIG. 5 may start a time $t_0$ 542. The time $t_0$ 542, in various embodiments, may be used as a reference to indicate that some time has passed between submitting the intent request 516 and attempting to access the protected resource (not shown in FIG. 5 for simplicity). Furthermore, although time $t_0$ 542 is shown in FIG. 5, the process 500 illustrated may not be completed at or during time $t_0$ 542. For example, the client device 502 may obtain the first bearer token 514 at a point in time prior to time $t_0$ 542 and may submit the intent request 516 at time $t_0$ 542.

The process 500, in some embodiments, starts when the client device 502 transmits a refresh token 510 to the authorization server 506. As described above, the refresh token 510 may be provided by the authorization server 506 to the client device 502 to allow the client device 502 to obtain additional bearer tokens. In response, the authorization server 506 may transmit the first bearer token 514 to the client device 502. In various embodiments, the client device 502 submits an API call including the first bearer token to the resource server 508. In these embodiments, the API call is the intent request 516, indicating the protected resource that the client device 502 is attempting to gain access to and the first bearer token 514 demonstrates that the client device 502 is authorized to access the protected resource.

The resource server 508, in response to the intent request 516, may attempt to validate the first bearer token 514 and determine whether the client device 502 is authorized to access the protected resource. Validating the first bearer token 514 may include transmitting a validation request 518 to the authorization server 506. In response, the authorization server 506 may provide validation information 520 indicating whether the client device 502 is authorized to access the protected resource. If the validation information 520 indicates that the client device 502 is authorized to access the protected resources, the resource server 508 may generate the access key 522.

As described above, the access key 524 may include cryptographically protected information including the first bearer token 514, one or more timestamp(s), a client identifier, and a resource identifier. The access key 524 may include additional information that can be used by the client device to obtain access to the protected resources. In addition, the access key 524 may not include some of the information indicated in FIG. 5. For example, if a protocol defines the interval of time during which the protected resource is accessible, the access key 524 may include no timestamps or may simply include a single timestamp. Once the access key 524 is generated it may be provided to the client device 502.

Figure 6:
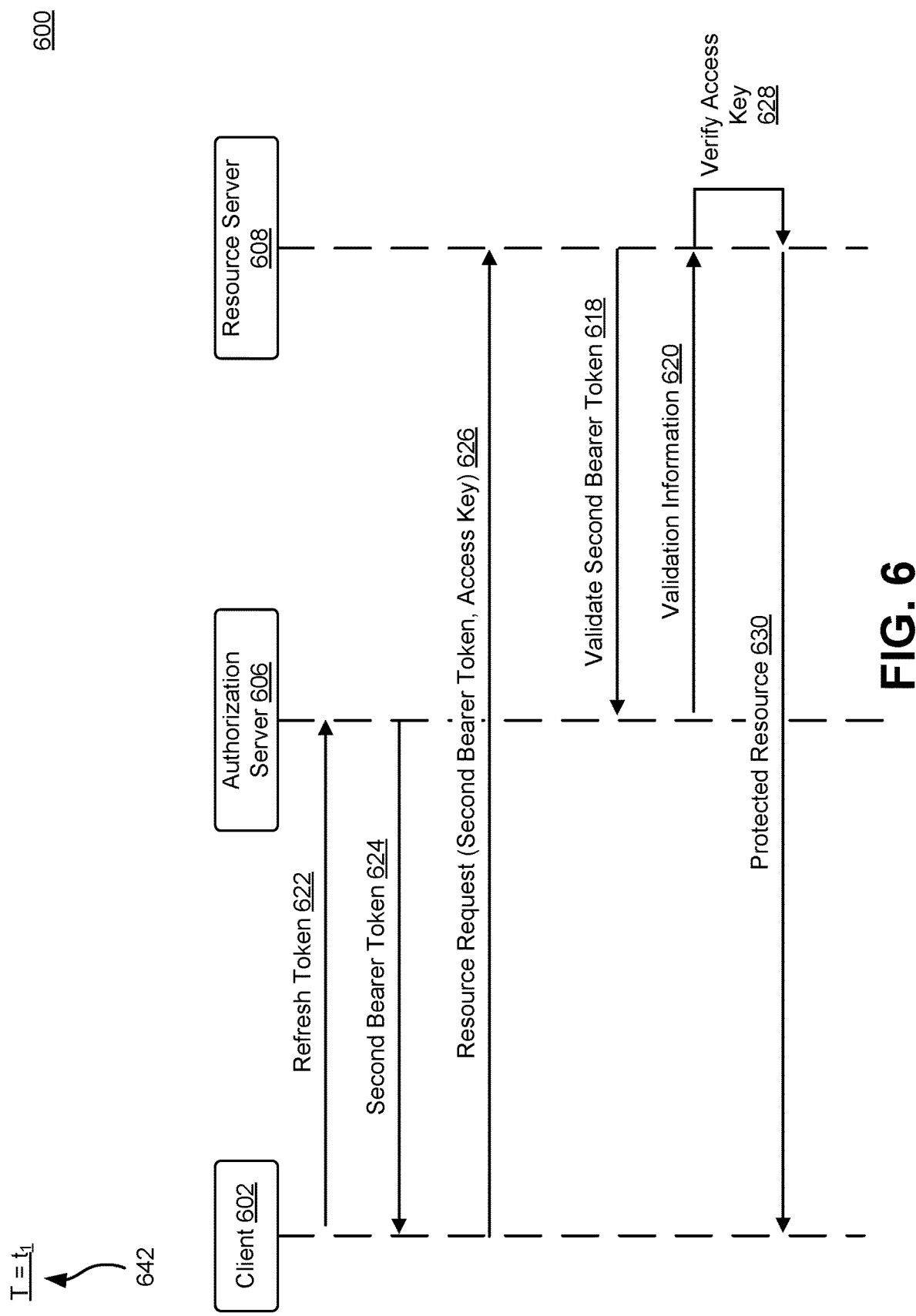
FIG. 6 shows an illustrative example of a process for obtaining access to a protected resource.

FIG. 6 is a messaging diagram illustrating a process 600 in which a client device 602 communicates with an authorization server 606 to obtain a second bearer token 624 in order to use the second bearer token 624 to submit a resource request 626 to a resource server 608 to obtain access to a protected resource. In various embodiments, the client device 602, authorization server 606, and resource server 608 include computing resources as described above, for example, in connection with FIG. 1. Furthermore, the process 600 illustrated in FIG. 6 may start a time $t_1$ 642. The time $t_1$ 642, in various embodiments, may be used as a reference to indicate that some time has passed between submitting the intent request to the resource server 608, providing the access key, and the client device 602 attempting to access the protected resource. Furthermore, although time $t_1$ 642 is shown in FIG. 6, the process 600 illustrated may not be completed at or during time $t_1$ 642. For example, the client device 602 may obtain the second bearer token 624 at a point in time prior to time $t_1$ 642 and may submit the resource request at time $t_1$ 642. Furthermore, time $t_1$ 642 may not be a single point in time but may include a window or interval of time. In one example, time $t_1$ 642 is the interval of time between the pair of timestamps included in the access key.

The process 600, in some embodiments, starts when the client device 602 transmits a refresh token 622 to the authorization server 606. As described above, the refresh token 622 may be provided by the authorization server 606 to the client device 602 to allow the client device 602 to obtain additional bearer tokens. In response, the authorization server 606 may transmit the second bearer token 624 to the client device 602. In various embodiments, the client device 602 submits an API call including the second bearer token 624 and the access key to the resource server 608. In these embodiments, the API call is the resource request 626, indicating that the client device 602 is attempting to access the protected resource and the second bearer token 624 demonstrates that the client device 602 is authorized to access the protected resource and the access key 628 is used to verify the conditions described above are satisfied. For example, that time $t_1$ 642 is within the range specified by the resource server 608 to access the protected resource and that the second bearer token 624 has been obtained by the client device 602.

In response to receiving the resource request 626, the resource server 608 may attempt to validate the second bearer token 624 and determine whether the client device 602 is authorized to access the protected resource. Validating the second bearer token 624 may include transmitting a validation request 618 to the authorization server 606. In response, the authorization server 606 may provide validation information 620 indicating whether the client device 602 is authorized to access the protected resource. If the validation information 620 indicates that the client device 602 is authorized to access the protected resources, the resource server 608 may then verify the access key 628 and/or the conditions for accessing the protected resource as described above.

In various embodiments, verifying the access key 628, is performed by the resource server 608. The resource server 608 may decrypt the access key 628 and/or verify a digital signature, message authentication code (MAC), tag, or other information used to authenticate the access key. As described above in connection with FIG. 2, in some embodiments, a cryptography server or other computer system may verify the access key 628 and return an indication of whether the access key is valid to the resource server 608. Verifying the access key 628, in various embodiments, includes verifying that the information contained in the access key is not only valid and authentic but that the information satisfies one or more conditions.

In one example, the resource server 608 verifies that time $t_1$ 642 is within the range specified by a pair of timestamps included in the access key. In another example, the resource server 608 verifies that the second bearer token 624 is different than a previous bearer token included in the access key. If the resource server 608 determines that the access key is valid and/or that the conditions are satisfied, the resource server 608 may provide the protected resource 630. However, if the resource server 608 determines that the access key is invalid and/or that the conditions are not satisfied, the resource server 608 may deny the resource request.

Figure 7:
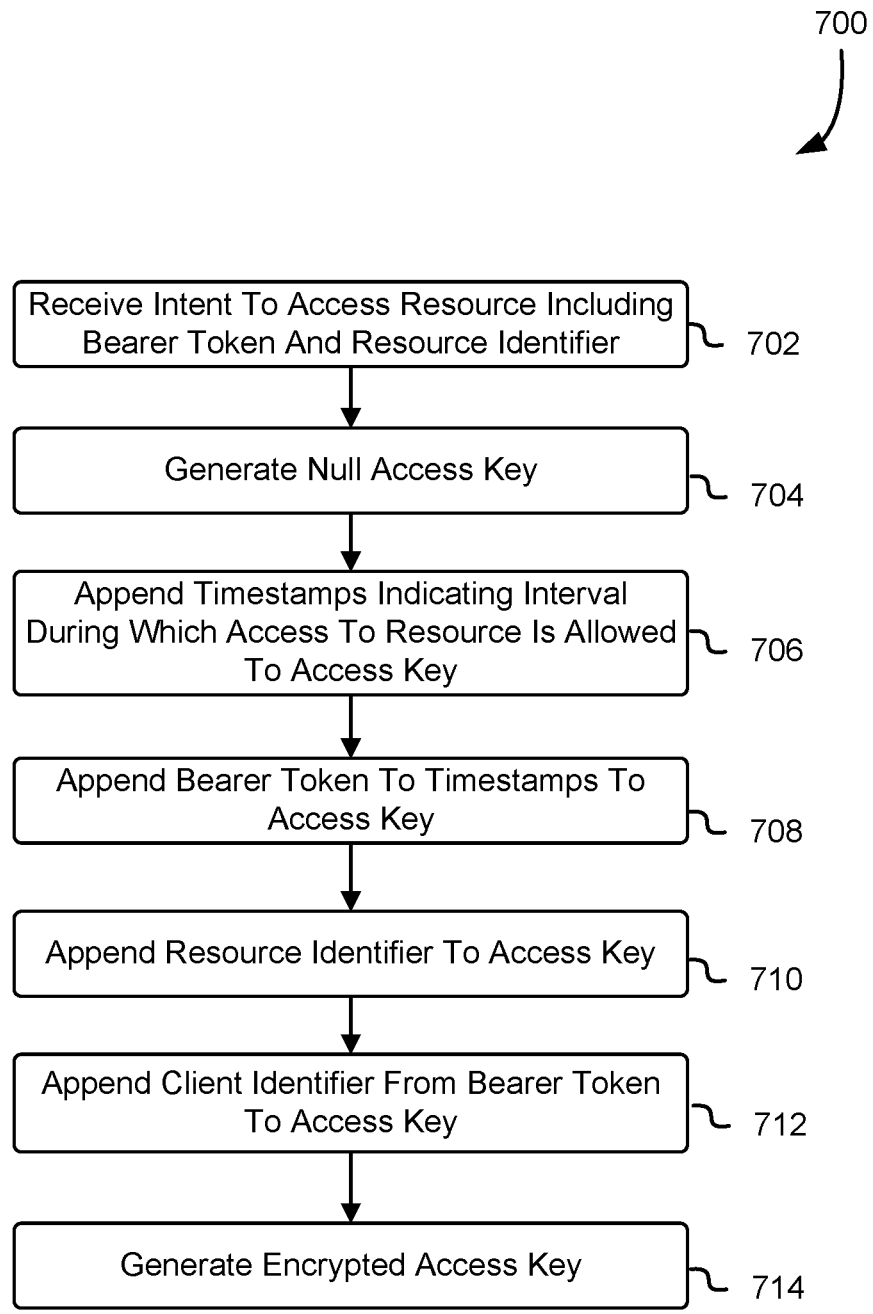
FIG. 7 shows an illustrative example of a process for generating an encrypted access key.

FIG. 7 is a block diagram illustrating an example of a process 700 for generating an encrypted access key in response to an intent request obtained from a client device in accordance with at least one embodiment. Some or all of the process 700 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the environment 200 described in conjunction with FIG. 2, such as the resource server 208, by multiple computing devices in a distributed system of a computing resource service provider, or by a service provided by a computing resource service provider. The process 700 includes receiving an intent request to access a protected resource, the intent request including a bearer token and a resource identifier 702. The intent request may include various operations involving protected resources such as a put or get operation associated with a database, a search query, a data transformation request, or any other request or operation of the client device or application executing thereon. In step 704, the system executing the process 700 generates a null access key. In various embodiments, a null access key includes a data structure or memory location to store information associated with the access key. For example, the null access includes a set of fields in which the system executing the process 700 inserts information as described below such as timestamp(s), resource identifiers, and the like.

In step 706, the system executing the process 700 generates one or more timestamps indicating an interval during which access to the protected resource is permitted. Designation of the interval of time may be performed in accordance with a defined protocol, indicated in the intent requested, availability of the resource server, or determined by the resource server based at least in part on other information associated with the intent resource and/or protected resource. In step 708, the system executing the process 700 appends the bearer token included in the intent request to the timestamp(s) to generate at least a portion of the access key. Then the system executing the process 700, in step 710, appends the resource identifier included in the access request to the portion of the access key. As described above, the resource identifier may include the path of the API called used to submit the intent request.

In step 712, the system executing the process 700 includes a client identifier with the access key. As described above, the client identifier may be obtained from the bearer token included in the intent request. In step 714, the system executing the process 700 generates the encrypted access key. In various embodiments, the resource server cryptographically protects the access key, as described above, so that the access key can be validated when obtained in a resource request. In one example, the access key is encrypted with a public key associated with the resource server. In another example, the resource server provides the access key in plain text to a hardware security module or other entity and obtains an encrypted access key in response. Note that one or more of the operations performed in steps 702-714 may be performed in various orders and combinations, including in parallel. In numerous variations to the process 700, one or more of the operations in steps 702-714 may be omitted or performed by other systems or services.

Figure 8:
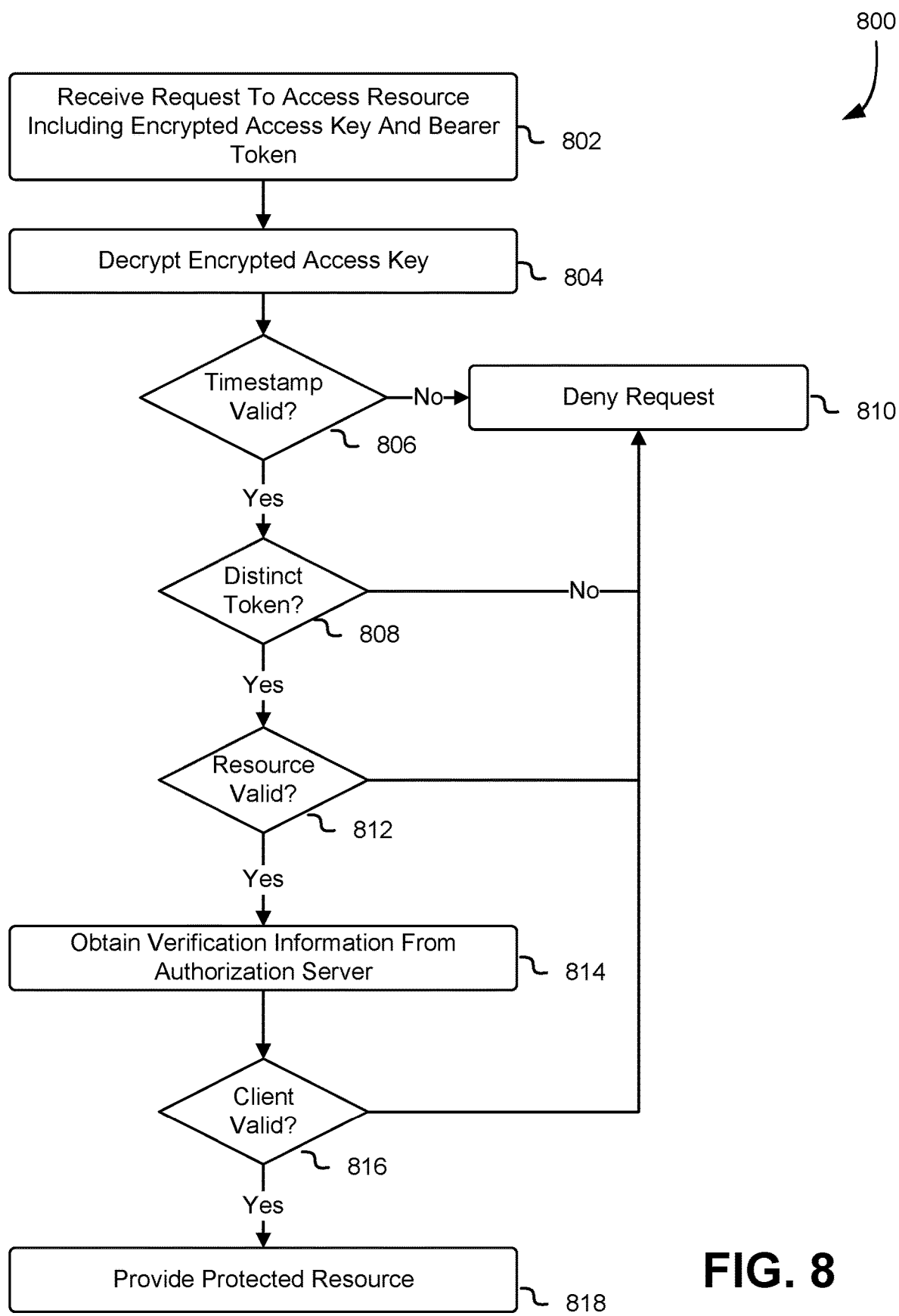
FIG. 8 shows an illustrative example of a process for validating an access request to access a protected resource.

FIG. 8 is a block diagram illustrating an example of a process 800 for determining whether an access key included in a resource request obtained from a client device is valid in accordance with at least one embodiment. Some or all of the process 800 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 800 may be performed by any suitable system, such as a server in a data center, by various components of the environment 200 described in conjunction with FIG. 2, such as the resource server 208, by multiple computing devices in a distributed system of a computing resource service provider, or by a service provided by a computing resource service provider. The process 800 includes receiving a resource request including an access key and a bearer token 802. The resource request may include various operations involving protected resources such as a put or get operation associated with a database, a search query, a data transformation request, or any other request or operation of the client device or application executing thereon.

In step 804, the system executing the process 800 decrypts the encrypted access key. In one example, the resource server decrypts the encrypted access key using a private key associated with the resource server. In yet another example, the resource server provides the encrypted access key to a hardware security module, cryptography server, or other entity which encrypted the access key and obtains the plaintext access key in response.

In step 806, the system executing the process 800 determines whether the timestamp(s) included in the access key indicate whether the current time is/are within an interval of time during which the client is permitted to access the protected resource. For example, the system executing the process 800 may determine whether the current time is within a range indicated by a pair of timestamps included in the access key as described above. In step 810, if the timestamp(s) is/are invalid (e.g., the current time is not within the indicated range), the system executing the process 800 may deny the request. However, in step 808, if the timestamp(s) is/are valid (e.g., the current time is not within the interval of time indicated by the timestamp(s)), the system executing the process 800 determines whether the bearer tokens (e.g., the first bearer token included in the access key and the second bearer token included in the resource request) are distinct. As described above, this ensures that the client device has obtained two different bearer tokens at two separate points in time to protect from the possibility of an attacker. If the bearer tokens are not distinct, the system executing the process 800, denies the request as described above in step 810. However, if the two tokens are distinct, the system executing the process 800 continues the process 800.

In step 812, the system executing the process 800 determines whether the resource identifier included in the resource request and/or access key is valid. In one example, the resource server determines whether the resource request is attempting to access the same protected resource as an intent request that was previously submitted and caused the resource server to generate the encrypted access key included in the resource request. In another example, the resource server determines whether the protected resource indicated by the resource identifier included in the access key is still valid (e.g., the protected resource is still available or has not otherwise become inaccessible, such as a result of a policy modification or deletion operation). If the resource identifier is invalid, the system executing the process 800, denies the request as described above in step 810. However, if the resource identifier is valid, the system executing the process 800 continues the process 800.

In step 814, the system executing the process 800 obtains verification information from an authentication server. As described above, in various embodiments, the resource server transmits a request to verify a bearer token included in the resource request to the authentication server. In step 816, the system executing the process 800 determines whether the client identifier included in the resource request and/or access key is valid. In one example, the resource server determines whether the client identifier included in the first bearer token obtained from the access key matches the client identifier obtained from the second bearer token included in the resource request. If the client identifier is invalid (e.g., the client associated with the first bearer token is different than the client associated with the second bearer token), the system executing the process 800, denies the request as described above in step 810. However, if the resource identifier is valid, the system executing the process 800 continues the process 800.

In step 818, once the system executing the process 800 has verified and/or validated the information in the resource request, including the access key, the system executing the process 800 provides the protected resource. In one example, the resource server transmits the requested information to the client device. Note that one or more of the operations performed in steps 802-818 may be performed in various orders and combinations, including in parallel. For example, the system executing the process 800 may verify and/or validate the information included in the resource request in parallel. For example, the system executing the process 800 may determine whether the bearer tokens are distinct in parallel with determining whether the resource is valid. In another example, the system executing the process 800 may obtain the verification information in parallel with steps 806-812. In other words, the processing of steps 806-812 may be performed while the system executing the process 800 waits from a response from the authorization server. In numerous variations to the process 800, one or more of the operations in steps 802-818 may be omitted or performed by other systems or services.

Figure 9:
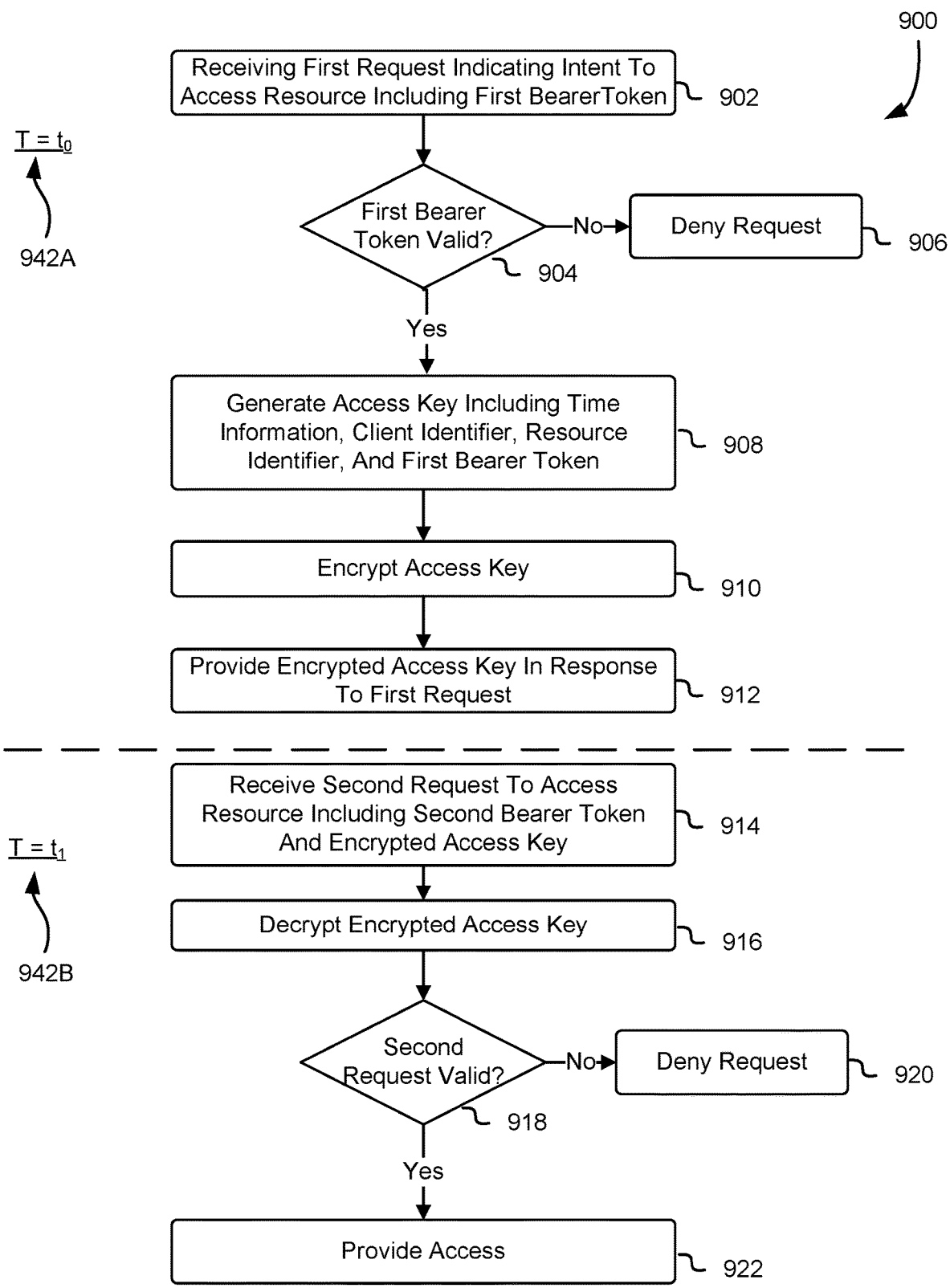
FIG. 9 shows an illustrative example of a process for registering an intent to access a protected resource and providing access to the protected resource in response to a valid access request.

FIG. 9 is a block diagram illustrating an example of a process 900 for securely providing access to a protected resource in accordance with at least one embodiment. Some or all of the process 900 (or any other processes described, or variations and/or combinations of those processes) may be performed under the control of one or more computer systems including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 900 may be performed by any suitable system, such as a server in a data center, by various components of the environment 100 described in conjunction with FIG. 1, such as the resource server 108, by multiple computing devices in a distributed system of a computing resource service provider, or by a service provided by a computing resource service provider. The process 900 includes receiving, at time $t_0$ 942A an intent request including a first bearer token 902, the intent request indicating an intent to access a protected resource at a later time (e.g., $t_1$ 942B).

In step 904, the system executing the process 900 validates the first bearer token. As described above, the resource server may transmit a request to an authorization server to validate the first bearer token. In response, the authorization server may return an indication of whether the first bearer token is valid. If the first bearer token is invalid, the system executing the process 900, in step 906, denies the request. However, if the first bearer token is valid (e.g., based at least in part on the information provided by the authorization server), the system executing the process 900 may continue to step 908. In step 908, the system executing the process 900 generates the access key which can include obtaining, organizing, and/or including time information (e.g., information representing a time interval during which the protected resource is accessible), a client identifier, a resource identifier, and the first bearer token within the access key. Generating the access key, as described above, may include appending or otherwise organizing the information together. For example, the system executing the process 900 initializes the access key (e.g., create an empty data object to contain the information described above) and then, when generating the access key, places the time information, the client identifier, the resource identifier, and the first bearer token within the access key. Furthermore, initializing the access key may include assigning or otherwise indicating a set of bits as a beginning and an end of the access key.

In step 910, the system executing the process 900 encrypts the access key. The access key may be encrypted to ensure that an attack is unable to modify, spoof, or otherwise compromise the information included in the access key. In various embodiments as described above, encrypting the access key includes various operations that cryptographically protect the access key. In step 912, once the access key is encrypted, the system executing the process 900 provides the encrypted access key in response to the intent request. Although some disclosed embodiments describe a request that includes a prior bearer token, it will be appreciated that the request could include any information that shows that the requestor has been authenticated to access the protected resource. A subsequent request that is received during an expected time that includes an indicia of a new authorization and the indicia of a previous authorization permits access to the protected resource. Man in the middle attacks that intercept authorizations are thwarted because access to the protected resources are granted only if the request is received during a specified time and if the request includes an indication that the requestor has been previously authorized.

Turning now to time $t_1$ 942B, the process 900 may be performed at two distinct time intervals. As described above, splitting the process 900 between two time intervals reduces the likelihood of an attacker obtaining access to protected information. In step 914, the system executing the process 900 receives a second request (e.g., a resource request as described above) including a second bearer token and the encrypted access key. In response to receiving the second request, the system executing the process 900 in step 916, decrypts the encrypted access key. In step 918, the system executing the process 900 determines whether the second request is valid based at least in part on the decrypted access key and the second bearer token. Furthermore, determining whether the second request is valid may be performed by at least executing the process 800 described above in connection with FIG. 8.

In step 920, if the system executing the process 900 determines that the second request or a portion thereof is invalid, the second request is denied. However, if the system executing the process 900 determines that the second request is valid, in step 922 access is provided to the protected resource. Note that one or more of the operations performed in steps 902-922 may be performed in various orders and combinations, including in parallel. In numerous variations to the process 900, one or more of the operations in steps 902-922 may be omitted or performed by other systems or services.

Figure 10:
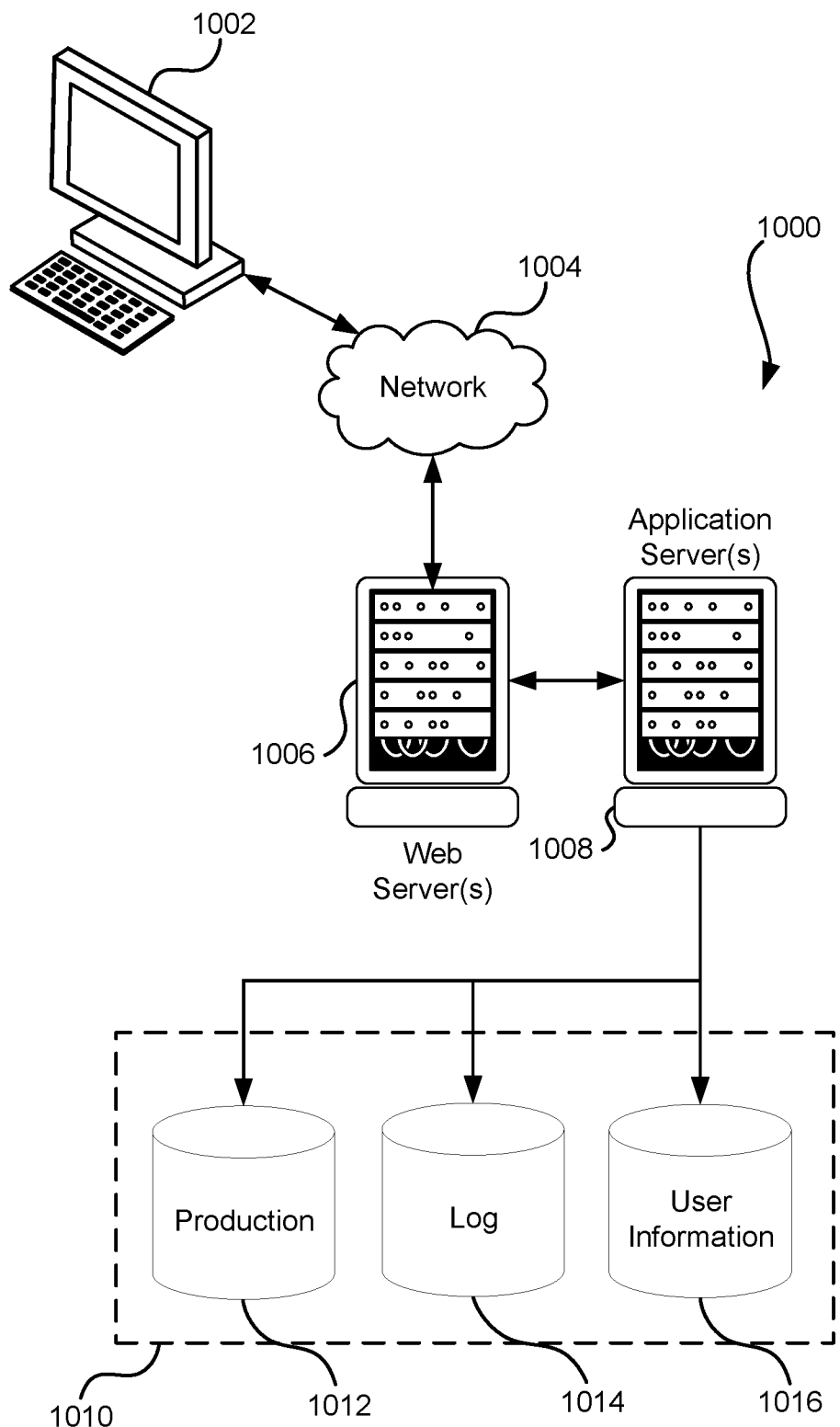
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, desktop computers, server computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. The data store 1010 may include protected resources as described above. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a first request that indicates an intent to access a resource, the first request including a first bearer token;
   verifying that the first bearer token indicates authorization to fulfill the first request associated with a client computer system responsible for providing the first request;
   generating an access key including the first bearer token and information that indicates an interval of time during which the access key is valid;
   encrypting the access key to obtain an encrypted key;
   providing the encrypted key in response to the first request;
   receiving a second request to access the resource, the second request identifying the resource and comprising the encrypted key and a second bearer token;
   decrypting the encrypted key to result in a decrypted key;
   verifying that the second request is received within the interval of time, that the second bearer token indicates authorization to fulfill the second request, and that the first bearer token and second bearer token are different; and
   providing access to the resource to fulfill the second request.

2. The computer-implemented method of claim 1, wherein verifying that the second bearer token indicates authorization to fulfill the second request further comprises:
   transmitting a verification request to an authorization server associated with the second bearer token; and
   obtaining, in response to the verification request, an indication that the client computer system is authorized to access the resource.

3. The computer-implemented method of claim 1, wherein providing access to the resource further comprises:
   encrypting the resource with the first bearer token to generate an encrypted resource; and
   transmitting the encrypted resource to the client computer system over a cryptographically protected communications channel.

4. The computer-implemented method of claim 1, wherein encrypting the access key further comprises encrypting the access key with a cryptographic key generated based at least in part on a resource identifier and a client identifier.

5. A system, comprising:
   one or more processors; and
   memory that stores computer-executable instructions that, as a result of being executed by the one or more processors, cause the system to:
      obtain a first request for access at a future interval of time, the first request including first proof of successful completion of a first authentication;
      generate an encrypted access key;
      provide, in response to the first request, the encrypted access key;
      obtain, during the future interval of time, a second request including the encrypted access key and second proof of successful completion of a second authentication;
      verify the second proof of successful completion of the second authentication based at least in part on the second proof of successful completion of the second authentication being different from the first proof of successful completion of the first authentication;
      determine that the first request and the second request are from a same requestor computing system based at least in part on the encrypted access key; and
      allow the second request to be fulfilled.

6. The system of claim 5, wherein the encrypted access key includes time information indicating the future interval of time during which the second request can be fulfilled; and
   wherein the memory further includes instructions that, as a result of being executed by the one or more processors, cause the system to verify that a current time is within the future interval of time.

7. The system of claim 5, wherein the instructions that cause the system to allow the second request to be fulfilled further comprise instructions that, as a result of being executed by the one or more processors, cause the system to encrypt a protected resource indicated in the first request with a bearer token included in the encrypted access key prior to fulfilling the second request.

8. The system of claim 5, wherein the encrypted access key is encrypted with a public key associated with the system; and
   wherein the memory further includes instructions that, as a result of being executed by the one or more processors, cause the system to cryptographically verify the encrypted access key by at least decrypting the encrypted access key with a private key associated with the system.

9. The system of claim 5, wherein the instructions that cause the system to analyze the encrypted access key further comprise instructions that, as a result of being executed by the one or more processors, cause the system to provide at least a portion of the encrypted access key to a second computer system for verification.

10. The system of claim 5, wherein the encrypted access key is encrypted with a cryptographic key generated based at least in part on a first identifier of a protected resource associated with the first request and a second identifier of the same requestor computing system responsible for providing the first request.

11. The system of claim 10, wherein the second identifier further identifies an application executed by the same requestor computing system attempting to access the protected resource.

12. The system of claim 10, wherein the instructions that cause the system to determine that the first request and the second request are from the same requestor computing system further comprise instructions that, as a result of being executed by the one or more processors, cause the system to obtain the second identifier from the encrypted access key and compare the second identifier to information included in the first request.

13. A non-transitory computer-readable storage medium storing thereon executable instructions that, as a result of being executed by one or more processors of a computer system, cause the computer system to at least:
  receive a first token from at least one authorization server;
  transmit a first request via a network to at least one resource server, the first request indicating an intent to access protected information, the first request to include the first token indicating authorization to access the protected information;
  receive, from the at least one resource server via the network in response to the first request, an acknowledgement to access the protected information during a future interval of time;
  in response to the acknowledgement, transmit a second request requesting a second token different from the first token from the at least one authorization server;
  obtain, in response to the second request, the second token from the at least one authorization server; and
  transmit, to the at least one resource server via the network, a third request to access the protected information during the future interval of time, the third request including the acknowledgement, the first token, and the second token.

14. The non-transitory computer-readable storage medium of claim 13, wherein the acknowledgement includes an access key that is encrypted by the at least one resource server.

15. The non-transitory computer-readable storage medium of claim 13, wherein the acknowledgement includes a client identifier, a resource identifier, or one or more timestamps.

16. The non-transitory computer-readable storage medium of claim 13, wherein the future interval of time is indicated by at least a pair of timestamps indicating a time window during which the protected information can be obtained by transmitting the third request.

17. The non-transitory computer-readable storage medium of claim 16, wherein the instructions that cause the computer system to transmit the third request further include instructions that cause the computer system to include the pair of timestamps in the third request.

18. The non-transitory computer-readable storage medium of claim 13, wherein the instructions further include instructions that cause the computer system to obtain the protected information from the at least one resource server.

19. The non-transitory computer-readable storage medium of claim 13, wherein the first token is obtained as a result of transmitting a refresh token to the at least one authorization server.

20. The non-transitory computer-readable storage medium of claim 19, wherein the first request is an Application Programming Interface (API) request.

* * * * *